A2

United States Patent
Inuzuka et al.

(10) Patent No.: US 9,537,314 B2
(45) Date of Patent: Jan. 3, 2017

(54) POWER SYSTEM VOLTAGE STABILIZER AND STABILIZATION METHOD

(75) Inventors: Tatsuki Inuzuka, Tokyo (JP); Hideyuki Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 14/240,100

(22) PCT Filed: Sep. 2, 2011

(86) PCT No.: PCT/JP2011/004925
§ 371 (c)(1),
(2), (4) Date: Feb. 21, 2014

(87) PCT Pub. No.: WO2013/030897
PCT Pub. Date: Mar. 7, 2013

(65) Prior Publication Data
US 2014/0191581 A1    Jul. 10, 2014

(51) Int. Cl.
*H02J 1/00* (2006.01)
*H02J 3/00* (2006.01)
*H02J 3/12* (2006.01)
*H02J 3/38* (2006.01)
*H02J 13/00* (2006.01)

(52) U.S. Cl.
CPC .. *H02J 3/00* (2013.01); *H02J 3/12* (2013.01); *H02J 3/382* (2013.01); *H02J 3/383* (2013.01); *H02J 3/386* (2013.01); *H02J 13/0006* (2013.01); *H02J 2003/003* (2013.01); *Y02E 10/563* (2013.01); *Y04S 10/54* (2013.01); *Y10T 307/696* (2015.04)

(58) Field of Classification Search
CPC ................ H02J 3/00; H02J 3/12; H02J 3/383; H02J 2003/003; Y02E 10/563; Y04S 10/54; Y10T 307/696
USPC .......................................................... 307/80
See application file for complete search history.

(56) References Cited

U.S. PATENT DOCUMENTS

| 6,925,361 B1 | 8/2005 | Sinnock |
| 2007/0068162 A1 | 3/2007 | Komura et al. |
| 2009/0160259 A1 | 6/2009 | Naiknaware et al. |
| 2010/0138063 A1 | 6/2010 | Cardinal et al. |

(Continued)

FOREIGN PATENT DOCUMENTS

| JP | 2007-110809 A | 4/2007 |
| JP | 2008-199703 A | 2/2008 |

(Continued)

OTHER PUBLICATIONS

Extended European Search Report received in corresponding European Application No. 11871692.7 dated Aug. 6, 2015.

(Continued)

*Primary Examiner* — Rexford Barnie
*Assistant Examiner* — Toan Vu
(74) *Attorney, Agent, or Firm* — Mattingly & Malur, PC

(57) ABSTRACT

In an electric power system with a distributed power source, a fluctuation of its system voltage is brought about by an amount of power generation of the distributed power source that depends on weather. Stabilization of the system voltage is realized by generating a driving signal of a switch that the system has from weather forecast information and power system information and switching a configuration of the system.

10 Claims, 11 Drawing Sheets

(56) References Cited

U.S. PATENT DOCUMENTS

2010/0204844 A1   8/2010   Rettger et al.

FOREIGN PATENT DOCUMENTS

| JP | 2008-182017 A |   | 8/2008 |
|----|---------------|---|--------|
| JP | 2008182017 A  | * | 8/2008 |
| JP | 2010-233352 A |   | 10/2010 |
| JP | 2010-259154 A |   | 11/2010 |
| JP | 2011-61963 A  |   | 3/2011 |
| JP | 2011061963 A  | * | 3/2011 |

OTHER PUBLICATIONS

Chinese Office Action received in corresponding Chinese Application No. 201180072396.5 dated Aug. 12, 2016.

* cited by examiner

FIG. 10
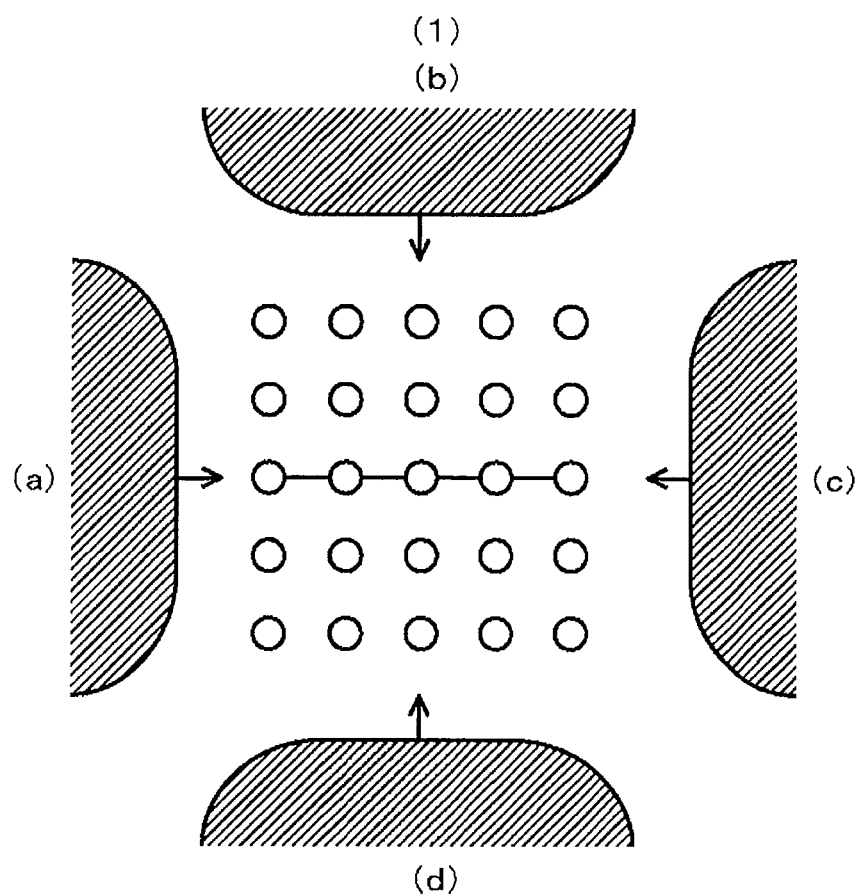
(1)
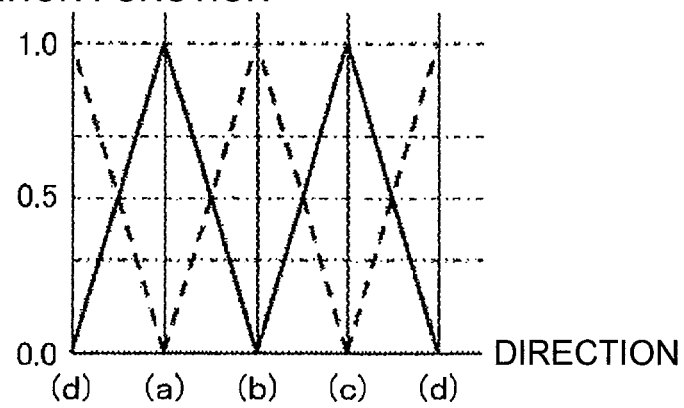
(2)

FIG. 11
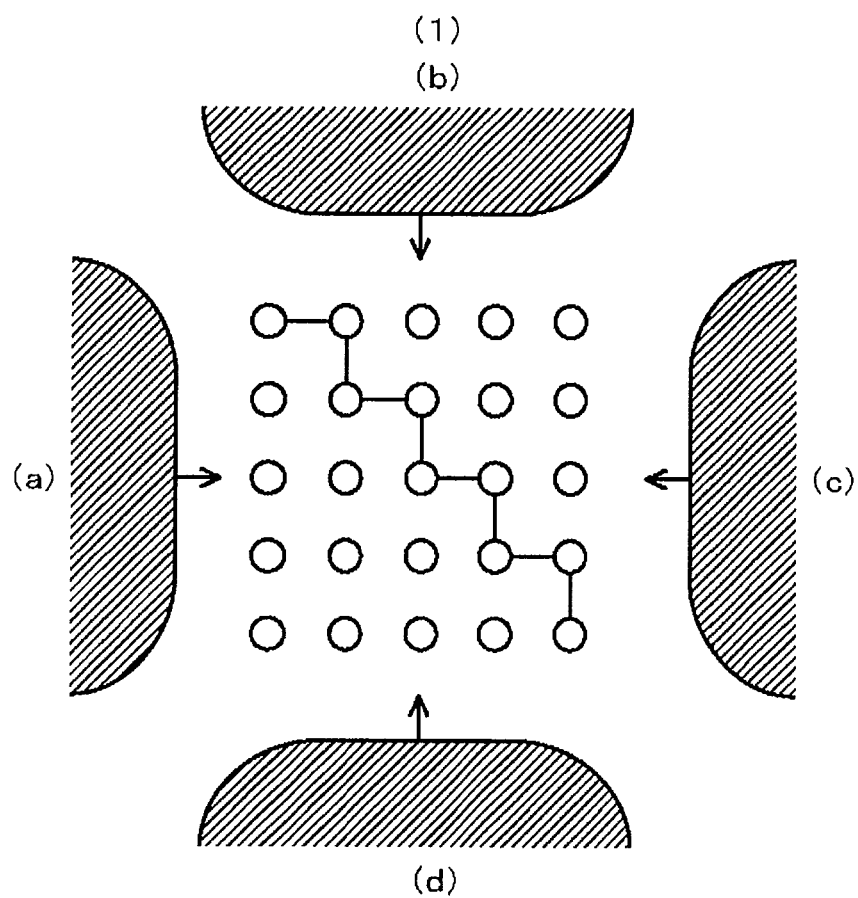
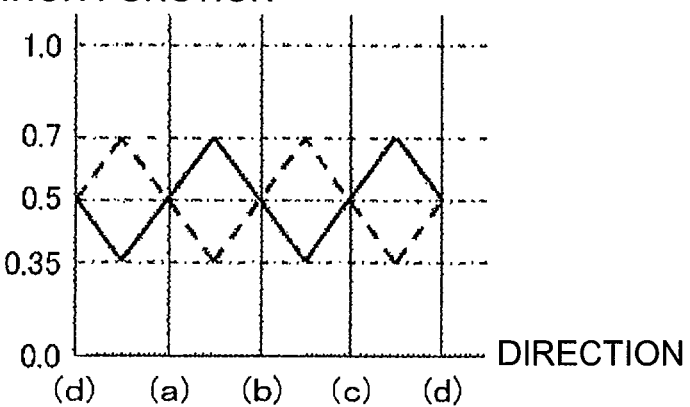

POWER SYSTEM VOLTAGE STABILIZER AND STABILIZATION METHOD

TECHNICAL FIELD

The present invention relates to a system stabilizer and a system stabilization method, and more specifically, to a system stabilizer and a system stabilization method each suitable for realizing stabilization of a system voltage in an electric power system to which distributed power sources, such as solar photovoltaic generation or wind power generation apparatuses, are connected.

BACKGROUND ART

Aiming at a low carbon society, mass introduction of apparatuses for generating electric power with natural energies, such as the solar photovoltaic generation (PV) and the wind power generation is expected. Since it is often the case that these are installed being distributed geographically compared with existing concentrated power sources, such as thermal power generation, hydraulic power generation, and nuclear power generation, they are called dispersion type power sources or the distributed power sources. Generally, whereas a consumer purchases and uses electric power that the concentrated power source supplies via the electric power system, a consumer having the distributed power source can use electric power that is generated in house for self-consumption. Then, the consumer purchases (buys) shortage power and can supply (sell) surplus power to the electric power system and can allot obtained money to recovery of a purchase expense of the distributed power source.

The electric power system is configured with many power sources, loads, impedances of the system itself, etc. combined together intricately. In a situation where each has a fluctuation factor, it is an important issue to perform stabilized electric power supply to the customers. A situation where the system voltage fluctuates causes an excessive voltage or current to be applied to the facility apparatus that is included in the electric power system, which may become a factor of degrading an apparatus characteristic, shortening its life, or the like. Moreover, it may become a destabilizing factor of an operation of the apparatus that the consumer possesses. Then, for example, a low-voltage system of electric power distribution has a system voltage range requirement of 101±6V. Conventionally, with the aim of maintaining stabilized operations of the system itself and linked apparatuses and suppressing a voltage fluctuation by loads etc., voltage stabilization technologies have been developed. For example, voltage control apparatuses, such as a load-time tap switching potential transformer (LRT), a step voltage control apparatus (SVR), and a static var compensator (SVC), are known.

However, the distributed power source has a different characteristic from that of the existing concentrated power source. First, an amount of power generation of the distributed power source using these natural energies fluctuates depending on climate conditions, such as the amount of solar radiation, a wind direction, and a wind force. Moreover, generally, the voltage falls as a position of the electric power system goes closer to its end, but the voltage on the end side of the system may rise by the distributed power source supplying surplus power to the electric power system. A combination of these characteristics will result in a fluctuation of the system voltage depending on the climate conditions.

A representative technology of suppressing deviation of the voltage from a permissible range in the electric power system to which the distributed power source is connected will be shown. In a technology described in Patent Literature 1, a fluctuation of the system voltage based on a weather forecast is predicted, and a voltage control by supplying a reactive power of the PV apparatus (PCS) is performed. In a technology described in Patent Literature 2, a system voltage distribution is inferred based on future weather information and judged whether electric power supply by a voltage regulator shall be done or not. In a technology described in Patent Literature 3, when there is a voltage rise by a reverse tidal current by PV power generation, switching by a switch is performed.

CITATION LIST

Patent Literature

Patent Literature 1: JP-A-2010-259154
Patent Literature 2: JP-A-2010-233352
Patent Literature 3: JP-A-2008-199703

SUMMARY OF INVENTION

Technical Problem

However, these conventional technologies do not assume that a distributed power source fluctuates in voltage in a short term. If a fluctuation of the system voltage is detected by a certain sensor and a control signal of a voltage control apparatus is generated based on the detection result, a time lag until the voltage control apparatus actually operates will occur. During the period until the operation, a voltage fluctuation will remain and an effect of sufficient stabilization will not be attained.

For example, in solar photovoltaic generation (PV), the power generation is performed by solar radiation from the sun, and the amount of solar radiation that reaches the PV apparatus fluctuates by a variation of the elevation angle of the sun according to season, weathers of fair weather, rainy weather, etc., a shadow due to a cloud, etc. It is known that an angle at which the sun faces the PV apparatuses is computable using latitude, longitude, etc. Regarding weather variation in a certain length of period, forecast information that the Meteorological Agency announces can be used. However, a variation of the amount of solar radiation (namely, a variation of an amount of power generation) caused, for example, by a cloud moving by wind is random, and it may vary on the second time scale. The amount of solar radiation can be measured using a pyrheliometer.

However, a relationship between the distributed power source that fluctuates depending on the weather conditions having a geographical expanse and an electric power system that is wired with a geographical expanse is not considered, and as a result, stabilization of the system voltage cannot be attained.

Introduction of such a distributed power source becomes a factor of fluctuating a state of the system from a viewpoint of the stabilization of the system (operating company). On the other hand, from a viewpoint of the distributed power source (a consumer), a fluctuation of the system state becomes a factor of hindrance at the time of supplying (selling) surplus power to the system. This implies that in a linkage point of the both, it is necessary to adjust output states (voltages etc.) of the distributed power sources according to the system state (voltage etc.), and if the adjustment is insufficient, selling of electric power will not be done as expected.

An object of the present invention is to provide a system voltage stabilizer and a stabilization method each capable of stabilizing the system voltage.

Solution to Problem

In order to attain the above-mentioned object, the present invention is configured to include an input part for inputting therein weather forecast information, and an instruction calculation part for obtaining an open/close instruction for connecting/disconnecting switches of the system so that the voltage fluctuation of the system affected by a weather fluctuation may be suppressed based on the weather forecast information and system configuration information.

Advantageous Effects of Invention

According to the present invention, generation of the voltage fluctuation itself can be suppressed by reconfiguring the system so that the fluctuation may be reduced based on the weather forecast information before the fluctuation takes place.

BRIEF DESCRIPTION OF DRAWINGS

FIG. 10 is a diagram for explaining a positional relationship of a direction of the cloud and a system configuration.

FIG. 11 is a diagram for explaining the positional relationship of the direction of the cloud and the system configuration.

DESCRIPTION OF EMBODIMENTS

Hereinafter, embodiments of the present invention will be described using drawings etc.

First Embodiment

Figure 1:
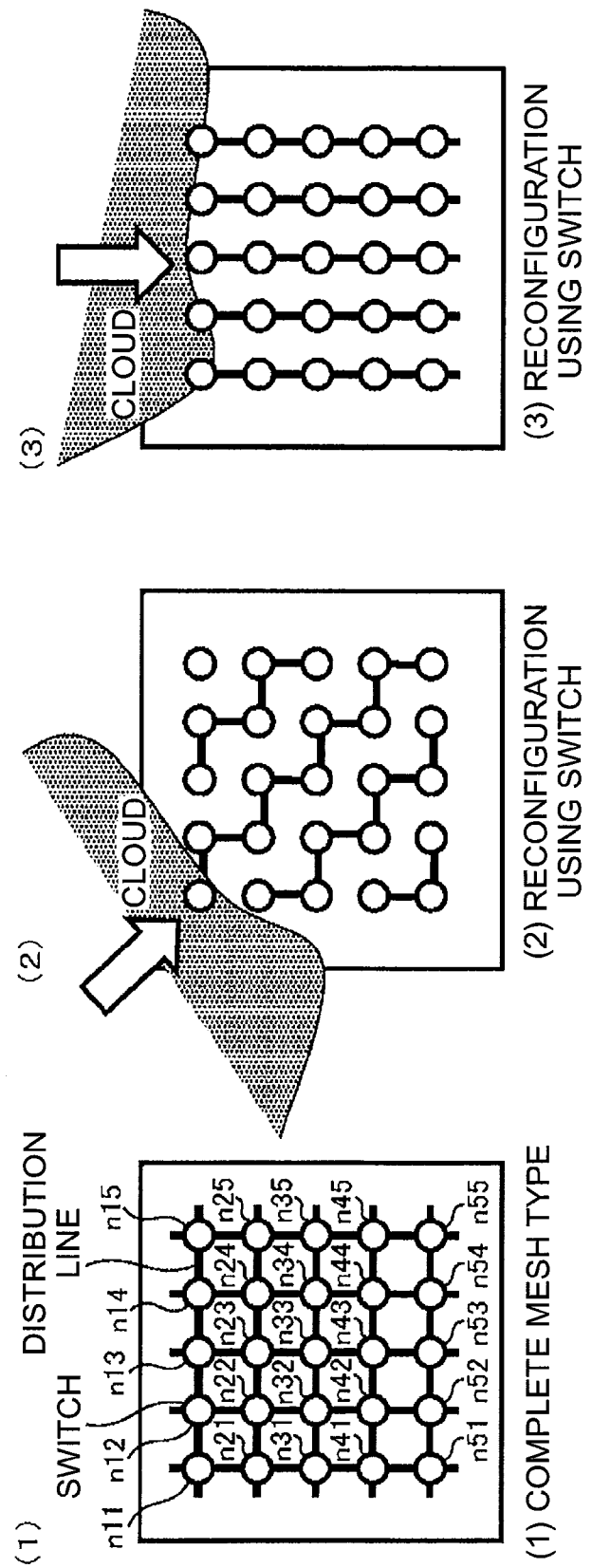
FIG. 1 is a diagram for explaining reconfiguration of a system using switches.

FIG. 1 explains the electric power system to which the present invention is applied. Although the electric power system is put into practical use as with system configurations, such as branched, meshed, and looped systems, in this embodiment, as shown in FIG. 1(1), the electric power system will be explained taking an ideal meshed power distribution system as an example. Naturally, the present invention is also applicable to the other system configurations described above. In the power distribution system, in order to disconnect a fault spot at the time of accident and to continue the electric power supply to a spot that is free from the fault, for example, it is operated so that multiple paths can be concatenated at proper spots. The switches are disposed at respective nodes (n11 to n55) of FIG. 1(1), and concatenation points are switched to ON/OFF so that the influence at the time of fault occurrence may not spread to a wide range.

In FIG. 1, switches (not shown) for connecting/disconnecting each of the nodes (n11 to n55) among four nodes, that is, upper side, down side, right side and left side nodes, are provided. For example, the switch is provided between the node n22 and each of the upper node n12, the lower node n32, the right node n21 and the left node n23, whereby the connection/disconnection is performed by each of the switches.

Figure 2:
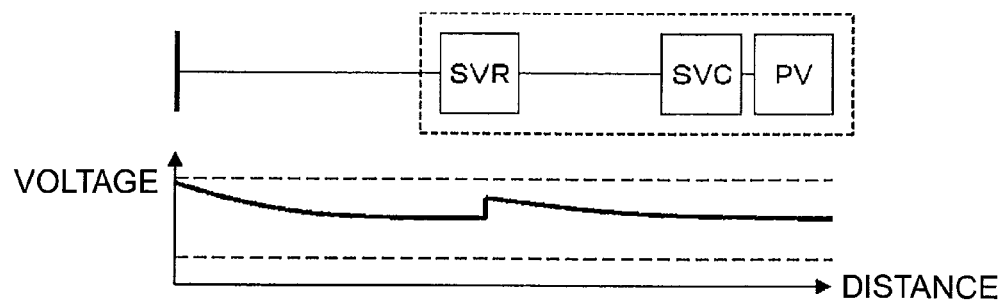
FIG. 2 is a diagram for explaining fluctuation of a system voltage having a distributed power source.

In FIG. 1, unillustrated distribution substations are connected to an upper part and a left part of the power distribution system that is shown as a whole, and electric power from the distribution substations is supplied thereto. Furthermore, at an arbitrary node (n11 to n55), the voltage control apparatuses, such as a load-time tap switching transformer (LRT), a step voltage control apparatus (SVR), and a static var compensator (SVC), are provided as voltage control apparatuses as shown in FIG. 2.

The stabilizer alters the system configuration by driving the switches based on the weather information in order to stabilize the system voltage of the electric power system having a distributed power source. As shown in FIG. 1(1), the power distribution system in a certain area is a mesh type, and the switches capable of switching arbitrary connections are connected at intersection portions of the mesh. Then, to an arbitrary node (n11 to n55), the distributed power sources, such as solar photovoltaic generation and wind power generation, are connected to the power distribution system connected by the switches.

Here, as a combination of operations of the switches that has the largest suppression effect against the fluctuation of an amount of power generation of the distributed power source, there is a method whereby all the switches are turned ON as shown in FIG. 1(1) to configure the system to have a system configuration of a complete mesh type. Since generally, the electric power system has characteristics of an inductance, a capacitance, and a resistance in itself, there is an effect of suppressing a voltage fluctuation and averaging it, a so-called leveling effect. Making the system into the complete mesh type means that the voltage fluctuation is shared by all the elements of the mesh, in which the leveling effect will work largely. However, as described above, when a fault occurs for a certain reason, an influence of the fault spreads to the whole. Moreover, the spreading of the influence of the fault to the whole also means that it becomes difficult to find out an occurrence spot of the fault. Thus, the complete mesh type enhances the leveling effect, but on the other hand, it lowers reliability of the system.

The SVR is a transformer for adjustment with taps which adjusts a voltage of the distribution line in a manner that the distribution line voltage is adjusted to fall within an insensitive band including a proper reference value by switching the tap of the transformer for adjustment. The voltage adjustment by the tap switching is done in a step form on a minute unit basis.

The static var compensator SVC has a reactive current generation part for generating an arbitrary reactive current, a voltage detection part for detecting the distribution line voltage, and a current detection part for detecting an output current of the reactive power generation part, and adjusts the distribution line voltage so that it may be kept to a reference value in an instant by inputting an output of the voltage detection part and an output of the current detection part as inputs and controlling the reactive current injected into the distribution line so that the distribution line voltage may be kept to the reference value. A principle of the voltage stabilization by the reactive power described above can be explained as follows. Considering a transformer substation as a voltage source of a voltage Vs, considering the SVC as a current source outputting a reactive current Iq, denoting a reactance portion and a resistance portion of the distribution line impedance as x and r, respectively, and denoting the distribution line voltage at an installation point of the SVC and a power factor angle as vi and θ, respectively, the following Formulae (1) and (2) hold.

$$Vi=Vs-(r+jx)\times Ig(\cos\theta+j\sin\theta) \quad (1)$$

Since the SVC outputs a reactive current, when setting cos θ=0 and sin θ=1 (positive in the case where a lead reactive current is outputted), Formula 1 becomes $$Vi=Vs-(r+jx)\times jIq=Vs+(x-jr)Iq \quad (2)$$

By changing a polarity and a magnitude of the reactive current that the SVC outputs, it is possible to adjust the distribution line voltage Vi at the installation point of the SVC to an arbitrary value. For generation of the reactive current, there are proposed: a SVG (Static Var Generator) system for outputting a reactive power to the distribution line by connecting a self oscillation inverter that is configured using a self arc extinguishing element, such as an IGBT and a GTO, through a reactor; a TCR (Thyristor Controlled Reactor) system in which a reactor is connected to a primary side of an output transformer through a thyristor to thereby configure a circuit for controlling a lag reactive current of the reactor with the thyristor, and an advanced-phase capacitor is connected in parallel to the circuit composed by the thyristor and the reactor; etc. Since both the systems perform operations using the semiconductor devices, each of them has a sufficiently rapid response characteristic.

Thus, regarding the power distribution system and its voltage distribution spanning from a distribution substation to a consumer having the solar photovoltaic generation apparatus (the PV apparatus) at an end, in an arbitrary node (n11 to n58) shown in FIG. 1, the voltage control apparatuses SVR, SVC are connected thereto for the purpose of suppressing the voltage fluctuation as shown in FIG. 2. Although the voltage tends to lower as approaching the end, the voltage is raised by the SVC and a reactive power is controlled by the SVR, so that the voltage requirement is performed. For example, since a domestic low voltage power distribution system is regulated to have a permissible range of 101±6V, the voltage is controlled not to get out of the permissible range, 101±6V, by performing the voltage control with a provision of the voltage control apparatus.

Regarding the switches, there is a method of operating them by transmitting the driving signal from a remote position, and in addition to this, they may be operated manually. Moreover, the switches are used also in order to disconnect temporarily a spot (a construction spot) of maintenance control of the system facility.

Figure 3:
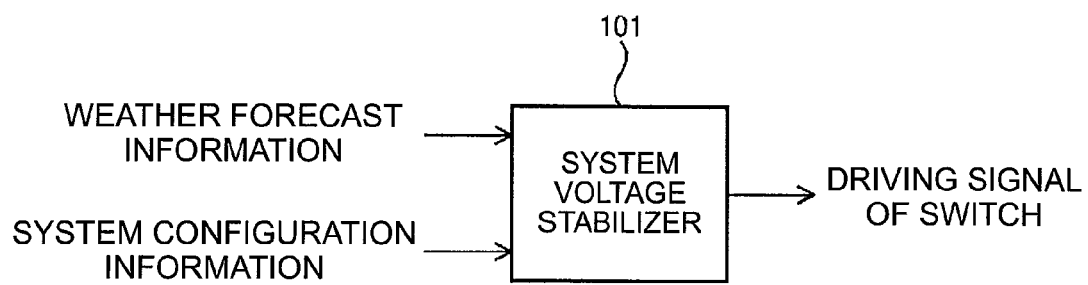
FIG. 3 is a diagram showing a stabilizer of the system voltage.

FIG. 3 shows a basic configuration conceptual diagram of a system voltage stabilizer 101. The stabilizer inputs therein weather forecast information and information related to a configuration of the electric power system having the distributed power source and outputs the driving signal of the switch that the electric power system has. Thereby, the stabilizer realizes a stable operation of the system by suppressing a fluctuation of the system voltage that results from the distributed power source as a factor. That is, it realizes the stabilization of the system voltage by generating the driving signals of the switches connected to the system based on the weather forecast information and power system information.

Figure 4:
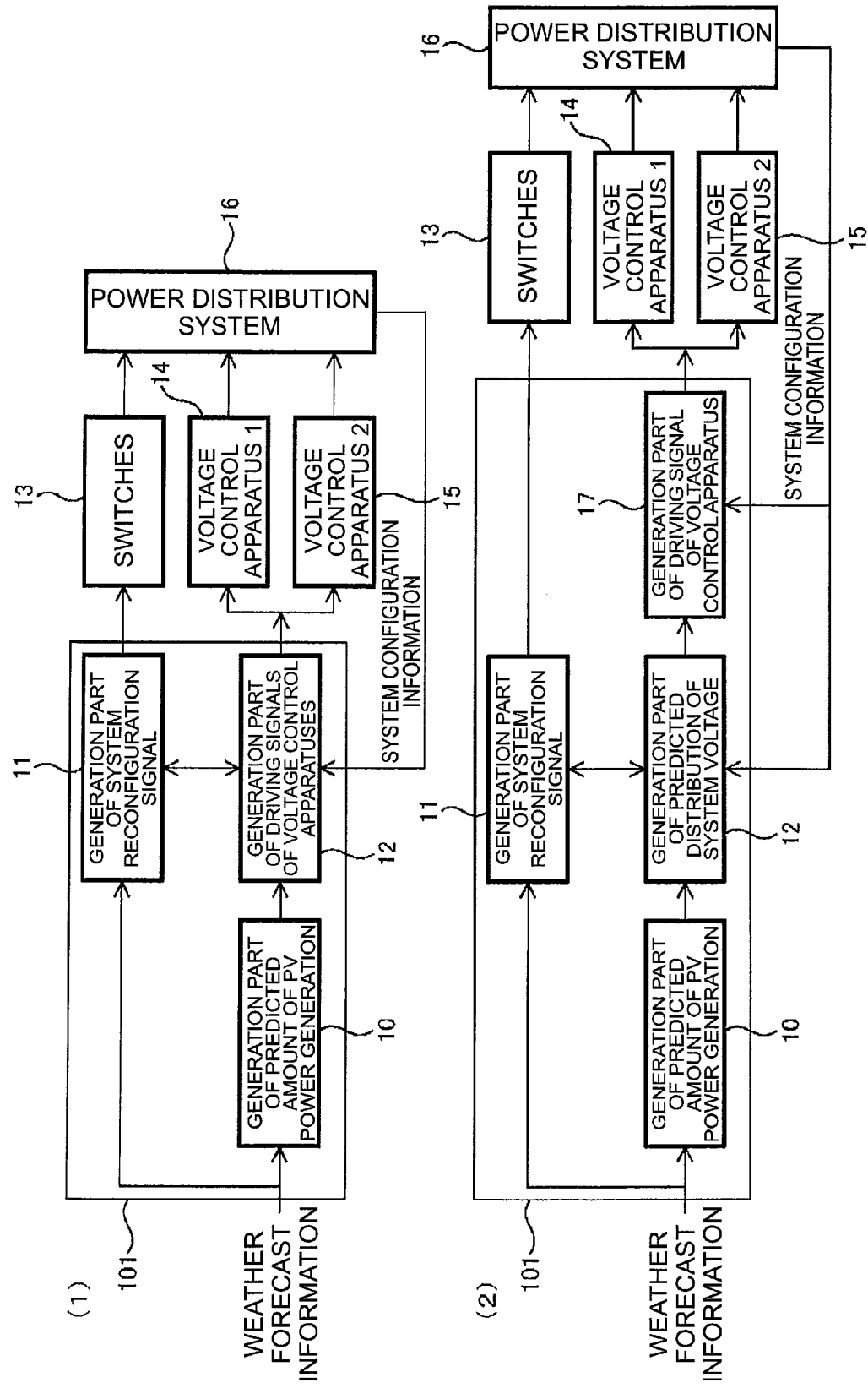
FIG. 4 is a diagram showing an example of the configuration of the stabilizer of the system voltage.

FIG. 4(1) shows a concrete configuration example of the system voltage stabilizer 101. A generation part 11 of a system reconfiguration signal outputs the computed driving signal of a switch 13 based on the weather forecast information and system configuration information. A generation part 10 of the predicted amount of PV power generation predicts the amount of power generation based on the weather forecast information, and a generation part 12 of the driving signals of voltage control apparatuses 14, 15 outputs control signals of the voltage control apparatuses 14, 15 based on the weather forecast. The driving signal of the switch 13 is computed based on information on a movement direction of a cloud contained in the weather forecast information etc. Moreover, in order to compute the control signals of the voltage control apparatuses 14, 15, the predicted amount of power generation of the PV apparatus is computed based on a magnitude of the amount of solar radiation contained in the weather forecast information. Furthermore, information on the reconfiguration of the system by the switch 13 and information related to the present system configuration are obtained, and the control signals of the voltage control apparatuses 14, 15 are computed. The voltage control apparatuses 14, 15 can be operated by combining different voltage control apparatus 1 and voltage control apparatus 2 like the SVR and the SVC. Moreover, as shown in FIG. 4(2), the following configurations may be adopted: a generation part 17 of the driving signal of the voltage control apparatus is provided, a predicted voltage distribution in the system is computed using a technique of tidal current computation etc. in the middle of computation, and the generation part 11 of the system reconfiguration signal and the generation part 17 of the driving signal of the voltage control apparatus perform arithmetic operations by using the computed result. In particular, a computation method of the control signal of the voltage control apparatus is not limited to a special one.

In FIG. 4, the generation part 10 of the predicted amount of PV power generation makes prediction calculation of the amount of power generation of a PV dynamo installed at an arbitrary node (n11 to n58) in FIG. 1 from the weather forecast information. Here, the weather forecast information is weather information ranging from the present moment to a prediction period, such as solar radiation, a wind direction, and a wind speed, and as for the prediction method, another prediction method may be used. The system information includes a geographical line, connection places of the power control apparatuses 14, 15, connection places of the switches 13, connection places of the distributed power sources (the PV apparatuses etc.), and the like. The switch 13 is a switch that is installed at a relay point, a concatenation point, etc. of the electric power system and, for example, functions to disconnect a fault spot at the time of a system accident and also functions to concatenate with another system. The generation part 11 of the system reconfiguration signal generates the driving signals of the switches 13 from the weather forecast information and the power system information, and reconfigures the system so that the system voltage may not deviate from the permissible range, or a deviation quantity may become minimum. Moreover, together with system reconfiguration by the switch 13, the generation part 12 of the driving signal of the voltage control apparatus can enhance an effect of stabilization by controlling the voltage control apparatuses 14, 15, such as the LRT, the SVR, and the SVC, in advance based on the predicted amount of PV power generation according to the weather forecast information. The generation part 11 of the system reconfiguration signal calculates the system reconfiguration based on the amount of power generation calculated by the generation part 10 of the predicted amount of PV power generation and the system configuration information from a power distribution system 16, and transmits the system reconfiguration signal that is an open/close instruction signal to the switches 13.

The switches 13 are controlled so as to be opened or closed in this manner. Moreover, the generation part 12 of the driving signal of the voltage control apparatus transmits the control signals to the voltage control apparatus 14 and the voltage control apparatus 15. This operates the voltage control apparatus, such as the SVC or the SVR, and the voltage control apparatus so that the system voltage may be maintained within a predetermined range.

Next, a specific operation of the generation part 11 of the system reconfiguration signal will be explained. Regarding the system reconfiguration signal, an evaluation function that will be explained below is prepared, and the system reconfiguration signal is generated so that the evaluation function may be minimized (or maximized). This system reconfiguration signal becomes a combination of the open/close instruction signals for the switches 13. Together with this, operations of the voltage control apparatuses, such as the SVR and the SVC, are generated as the system reconfiguration signals.

The purpose of generation of the system reconfiguration signal is to alter the system configuration so that the fluctuation of the system voltage arising by a fluctuation of the amount of power generation of the distributed power source may become small. In the case of the solar photovoltaic generation, a variation of the amount of solar radiation causes the amount of power generation of the PV apparatus to vary. Then, the system voltage varies by the electric power supply from the PV apparatus to the electric power system. Here, assuming that the PV apparatus and the electric power system are connected with a short distance, it can be considered that the PV apparatus is almost on the electric power system. On the other hand, solar radiation can be considered a distribution signal that has a geographical expanse affected by the sun and the cloud. Thereby, the geographical relationship between the solar radiation and the electric power system both of which have local expanses becomes an important factor. Simply stated, provided that a variation direction of the amount of solar radiation and a direction in which the electric power system extends are in parallel, a variation of the solar radiation influences gradually the PV apparatus connected with the system, and therefore the variation of the amount of PV power generation tends to become small. On the other hand, provided that the directions of the both cross at right angles, since it will affect the PV apparatuses connecting to the system collectively, the variation of the solar radiation will tend to cause the variation of the amount of PV power generation to become large. In this way, by generating the signal of the system reconfiguration based on the variation of the amount of solar radiation so that a geographic disposition of the electric power system may be reconfigured, it is possible to suppress the voltage fluctuation of the electric power system. Such reconfiguration can be realized using the switches, as described above.

In the case of the wind power generation, since the wind speed and the wind direction vary having a geographical correlation, the voltage fluctuation of the electric power system can be suppressed by reconfiguration of the system using a geographical relationship with the electric power system.

The PV apparatus is installed on the consumer's roof and is supplying its surplus power to the power distribution system. Here, for simplicity, it is presupposed that an installation spot of the PV apparatus and its connection place with the power distribution system are at the same position geographically. Moreover, it is presupposed that the movement direction, a speed, and a shape of the cloud are constant, and a variation of the solar radiation on the ground synchronizes with a movement of the cloud.

The weather forecast information is inputted into the generation part 11 of the system reconfiguration signal. Here, weather of a certain area is shown by the amount of solar radiation, a wind force, the wind direction, etc. as the weather forecast information, forecast information that the Meteorological Agency releases can be used, for example. In addition, if what is needed is the amount of solar radiation, for example, it can be used as data by image analysis of satellite photographs, and by analysis of all sky camera images. Furthermore, a pyrheliometer and an air speedometer may be installed uniquely, and these pieces of information obtained therefrom may be used to be analyzed by the generation part 11 of the system reconfiguration signal. The amount of solar radiation varies with various temporal indices, such as the altitude of the sun over a year, the altitude and azimuth of the sun over one day, and interception of the solar radiation by a cloud in one day.

The variation of the solar radiation by the movement of the cloud shows a fine characteristic geographically and temporally. For example, a variation of the solar radiation by the movement of the cloud may be reduced to half or doubled in several seconds. Such a variation of the solar radiation may be predicted by an analysis of taken images of the cloud by a camera, or by an analysis of measurement data of the pyrheliometer installed on the ground, or the like. For example, multiple pyrheliometers are disposed being distributed with respect to an area, and the variation of the solar radiation caused by the movement of the cloud is found from measurement data thereof, whereby a short-term forecast information on the variation of the amount of solar radiation caused by the movement of the cloud can be made. Although the weather forecast information is obtained or generated and then used, various alternative methods may be used without limiting to these specific prediction methods. In the following explanation, the weather forecast information related to the amount of solar radiation and the PV apparatuses for generating power with solar radiation will be given concrete explanations. Moreover, it goes without saying that by doing similarly, the weather forecast information related to both the wind direction and the wind speed and also the wind power generation can be applied.

The generation part 11 of the system reconfiguration signal finds out the driving signal of the switch 13 that concatenates the power distribution system based on the weather forecast information for the purpose of making gentle the fluctuation of the amount of PV power generation by the variation of the solar radiation. This problem can be solved as an optimization problem where a certain evaluation function is prepared and this evaluation function is minimized (or maximized). The present invention does not limit a solution method of the optimization problem. In this way, the driving signal of the switch 13 is computed by applying the evaluation function to a combination of open and close of all the switches 13 shown in FIG. 1.

Although the present invention does not limit a form of the evaluation function, an example will be shown below. Consider an electric power system (a power distribution system) shown in FIG. 1 in which the switches are disposed in the form of mesh in a certain area. As described above, a lattice point of the mesh is called a node, and a connection direction of the system at the node is selected by the switches. When all the switches are turned ON, the system becomes to have wiring of a perfect mesh form; when the switches in the horizontal or vertical direction are turned ON, it becomes to have wiring whose lines are in parallel. There is the PV dynamo between the nodes as the distributed power source, and when the amount of solar radiation is strong, electric power selling is performed. When this operation (ON/OFF) of the switch is decided using the evaluation function, many methods are found out for formulization depending on how to take a variable even if each of them is for the same purpose. This is because replacement with a relevant factor can be done since there are many factors relevant to the system voltage.

(1) First, since a fundamental problem is the voltage stabilization of the system into which the distributed power source is introduced, the evaluation function that takes the system voltage as a variable is appropriate.

(2) There is a case where a certain amount of the voltage fluctuation can be corrected locally by a proper voltage control apparatus. For example, in the case of a gentle voltage fluctuation, use of the SVR is conceivable. Although for a rapid voltage fluctuation, use of the SVC is conceivable, a correction range is limited in this case, and also it is relatively expensive. Then, as the evaluation function, a magnitude of a short-term system voltage fluctuation that takes place by a short-term variation of the amount of solar radiation can be taken as a variable. This short-term variation is expressed with a high frequency component, a derivative, or the like of the system voltage, for example.

(3) The short-term variation of the amount of solar radiation is often caused by a main factor of shielding of solar radiation by the flow of the cloud. Although the cloud moves by wind, it is less often that the wind direction and the wind speed change rapidly. Thereby, a shorter-term flow of the cloud can be replaced with a flow of wind. In this way, the flow of wind and the fluctuation of the system voltage can be associated with each other. At this time, the voltage variation becomes most rapid when the wind direction and a direction in which the nodes extend cross at right angles. Then, a flow direction of the cloud and the direction in which the nodes extend can be taken into the evaluation function.

(4) The above-mentioned relationship (3) between the direction of the wind and the direction in which the nodes extend can be converted into an inter-node distance measured in the direction of the wind. That is, the shorter the distribution of the inter-node distances measured in the direction of the wind, the much rapid the voltage fluctuation becomes. From this, the inter-node distance measured in the direction of the wind may be used as the evaluation function.

Thus, the evaluation function can be replaced with a different expression form that has although almost the same purpose.

In order to simplify the explanation, a system configuration such that the nodes are arranged on a square lattice is prepared. Here, it is presupposed that, in the node, a four-direction system connection can be arbitrarily set up using the switches. It is presupposed that, in the node, the same number of solar power generation apparatuses (the PV apparatuses) are disposed between the nodes as the distributed power source, and are linked to the system. It is presupposed that the PV apparatus causes the system voltage to rise by generating a power by receiving solar radiation and supplying electric power to a linked system. When there is no variation of the solar radiation, the amount of power generation of the PV apparatus becomes constant, and the voltage of the system that receives electric power supply from the PV apparatus also becomes in a steady state. At this time, by using the voltage control apparatus (the SVR, the SVC, etc.), the voltage distribution is controlled so as to be within a specified range, so that the system voltage can be stabilized. Such a voltage distribution of the voltage system can be expressed by a graph with an ordinate representing the voltage and an abscissa representing the direction in which the nodes extend. Incidentally, when there is a flow of the cloud, the amount of solar radiation may vary in time because of shielding by the cloud. The amount of PV power generation varies according to the amount of solar radiation, which brings about the fluctuation of the system voltage. At this time, the system voltage will be affected by climate conditions, such as the flow direction and the speed of the cloud, and a connection state of the nodes. Here, assuming that the node connection of the system is a combination of a longitudinal direction and a transverse direction, FIG. 10(1) shows a mode where the nodes extend continuously in the transverse direction as the node connection direction, and FIG. 11(1) shows a mode where the nodes extend in an oblique direction that is formed by repeating the longitudinal direction and the transverse direction sequentially. Although the flow of the cloud is an arbitrary direction, four directions of (a), (b), (c), and (d) are shown as representatives. Other than what is described above, there are many variations, such as a mode where the inter-node connection is made in an oblique direction and a mode where the voltage control apparatuses are combined, but their explanations are omitted here.

For example, in the case of a combination of the system connection of FIG. 10(1) and a direction of the cloud (b), the both cross at right angles and the flow of the cloud can pass over all the nodes existing in this system instantly (=distance 0). In other words, since the variation of the amount of solar radiation that varies by a flow of the cloud covers the whole system momentarily, the amount of PV power generation changes in an instant, which will bring about an instantaneous fluctuation of the system voltage. When the direction of the cloud is (a), the both cross at right angles, and since the both are in parallel, the inter-node distance and a distance over which the cloud flows are the same. In other words, since the amount of PV power generation varies gradually, the fluctuation of the system voltage will also arise gradually. The gentler this variation is, the easier it is to attain the effect of the voltage stabilization that uses the voltage control apparatus etc. Moreover, with this gentle variation, even when the variation of the amount of solar radiation that proceeds gradually or a variation of the system voltage is collected by certain means and is used as a prediction signal for the voltage control, a time margin will be easily obtainable.

Thus, a distance over which the cloud bringing the variation of the solar radiation between the nodes moves between the nodes (if being converted, it is a movement time) becomes a numerical value that varies depending on the system connection and the direction of the cloud. Here, a distance over which the cloud flows between the nodes of the system is designated as the evaluation function. Since the larger the distance over which the cloud flows, the more time the cloud takes for movement, the voltage fluctuation per unit time becomes smaller; therefore, this evaluation function corresponds to stability of the voltage. Expressing this in a formula, it goes as Evaluation function=(Distance over which the cloud flows)/(Inter-node distance).

FIG. 10(2) shows an evaluation function plot of FIG. 10(1). A broken line plot in the figure shows a case where the system connection is in the longitudinal direction. The ordinate shows a value of the evaluation function. The abscissa represents the movement directions of the cloud, which are distinguished by (a), (b), (c), and (d). Incidentally, since a movement direction of the cloud is an arbitrary direction that is not limited to the four directions; (a), (b), (c), and (d) are connected continuously. When the flow direction of the cloud (a) and the direction in which the nodes extend cross at right angles, the evaluation function takes a minimum 0. When the flow direction of the cloud (a) and the direction in which the nodes extend are in parallel, the evaluation function takes a maximum 1. The value for another direction is calculable similarly. Since a difference of the maximum and the minimum is large in this system configuration, if the direction of the cloud shifts, an evaluation value will also fluctuate largely.

FIG. 11(2) shows an evaluation function plot of FIG. 11(1). A broken line plot in the figure shows a case where the system connection is in a reverse oblique direction. When the cloud proceeds in the flow direction of the cloud (a) by one unit, the inter-node distance becomes two because the direction in which the nodes extend is a zigzag with a longitudinal line and a transverse line, and a value of the evaluation function becomes 0.5 (=½). When the flow of the cloud lies in the middle of (a) and (b), the inter-node distance is similarly 2, but the cloud proceeds on a slant line 1.41 (=route 2) of the square lattice, the value becomes 1.41/2=about 0.7. A value for another direction is also calculable similarly. In the case of this system configuration, since a difference of the maximum and the minimum is small, even if the direction of the cloud shifts, a fluctuation of the evaluation value is small. As described above, since this evaluation function is equivalent to voltage stability, it becomes that the larger the numerical value, the smaller the fluctuation of the system voltage caused by the flow of the cloud is. In other words, it is understood that the voltage stability varies by switching the direction in which the nodes extend according to the flow direction of the cloud. The present invention is characterized by controlling the stability of the voltage by switching the node connection direction of the system using such relevance between climate conditions and the system voltage.

Figure 12:
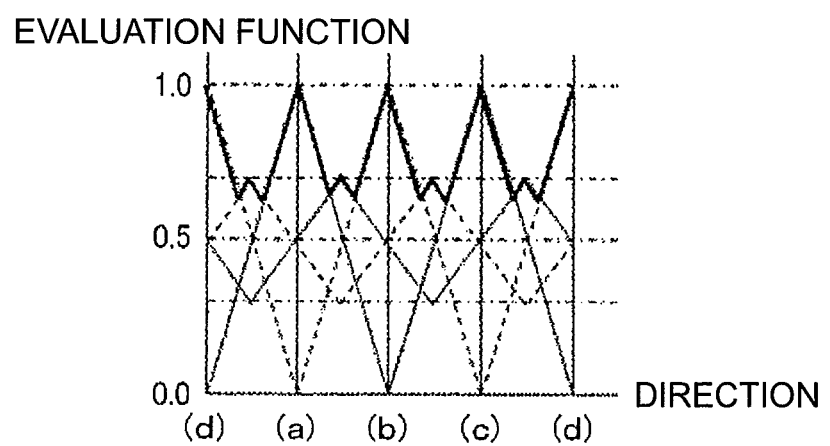
FIG. 12 is a diagram for explaining voltage stabilization based on the system reconfiguration.

FIG. 12 shows a relationship between the system reconfiguration and the voltage stabilization summarizing the above-mentioned result. By selecting a connection form of the system existing in an upper portion (thick line in the figure) of the plot according to the direction of the cloud, a control of the system reconfiguration that enhances the voltage stability can be realized. For example, when the wind direction is (a), the system connection in the transverse direction shown in FIG. 10(1) that shows a highest numerical value is selected. When the wind direction is in the middle of (a) and (b), the system connection to an oblique direction shown in FIG. 11(1) that shows a highest numerical value is selected. Although the example in which the nodes of the square lattice were arranged was explained in the above, the control signal of the system reconfiguration can be generated by preparing a similar evaluation function in an arbitrary system configuration.

Moreover, although in what was described above, the inter-node distance is used as an index, it may process information related to many nodes statistically and use it.

It goes without saying that a voltage control characteristic by the voltage control apparatus etc., disposition places of the distributed power sources such as PV, and the like can be introduced into the evaluation function as variables. Moreover, since an error (noise) may be included in the measurement data of weather etc., some filtering processing may be combined with this.

Node positions of an actual electric power system are in a complicated combination, and their connection directions may be restricted. In such a case, some statistical processing may be used.

Although the present invention has its principle in finding an optimal solution based on the evaluation function, a local optimal solution shall be included here. Putting it simply, the local solution is a solution when limiting a range that the solution can take. Many of exploratory solutions of the optimal solution are incapable of searching all solutions that can be taken within a practical time. For example, although the Taboo method known as one of the search techniques of the optimal solution is characterized by having a procedure of avoiding to obtain the local solution, it may still have the local solution from a restriction of search time etc. However, this example can also be interpreted as the optimal solution acquired in a given search time. Moreover, as another example, when the numerical value used in the computation of the evaluation function includes an error, which corresponds to a case where it is difficult to correctly measure the characteristic of the power system, a reason of strictly comparing magnitudes of numerical values will fade. From these practical viewpoints, the present invention does not hamper use of the local solution, without restricting solutions to the optimal solution.

For the combinations of open/close of all the switches, in a group that is formed with the nodes (n11, n55) in the combination being connected, the voltage fluctuation in the group is designated as the evaluation function using the predicted amount of power generation by the generation part 10 of the predicted amount of PV power generation that has already been computed. Then, the group whose evaluation function becomes minimum (or maximum) is considered a solution, and the generation part 11 of the system reconfiguration signal obtains the open/close signal for the switch 13.

Figure 5:
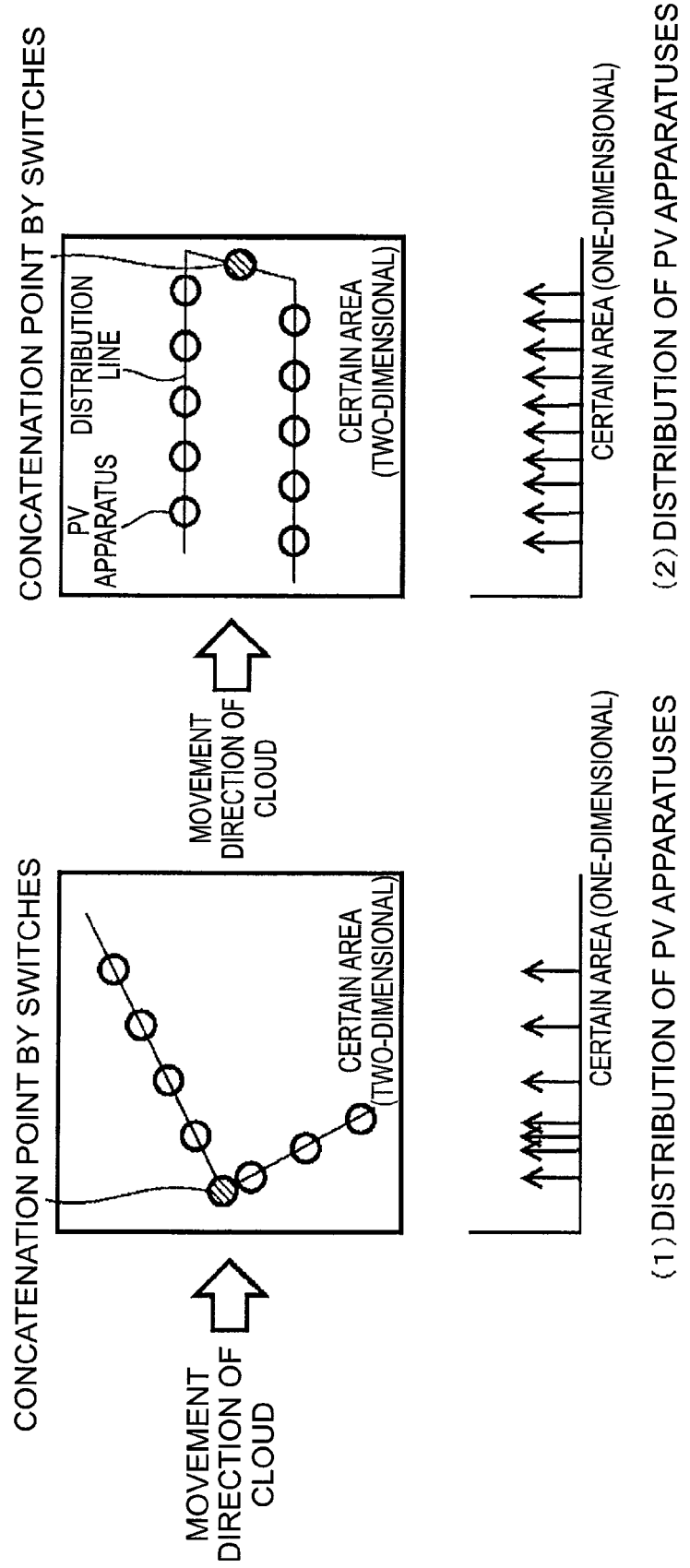
FIG. 5 is a diagram for explaining concatenation of systems using the switches.

A concrete example of generation of the open/close signal will be explained using figures. FIG. 5 illustrates a distribution of the PV apparatuses as an example. The PV apparatuses distributed two-dimensionally can be replaced with a distribution on one-dimensional coordinate axis that is taken in the movement direction of the cloud. As shown in the FIG. 5(1), even when the PV apparatuses are arranged with equal intervals on the power distribution system, there is a case where the intervals of the PV apparatuses are different when seeing from the movement direction of the cloud, and therefore the average interval of the PV apparatuses will take a different value depending on the movement direction of the cloud.

That is, in order to perform grouping so that an average interval formed by nodes (n11 to n55) may become largest in each group where the nodes (n11 to n55) are connected, the generation part 11 of the system reconfiguration signal performs grouping so that an average interval formed by the nodes (n11 to n55) may become the largest, and calculates the open/close signal to the switch 13 so that the evaluation result of the evaluation function may become the smallest (or it may become the largest) using the evaluation function.

In what is described above, the generation part 11 of the system reconfiguration signal can grasp disposition places of the distributed power sources as a phase as shown in FIG. 5(2), instead of the average interval, and can put it into an arithmetic operation. In two power distribution systems, a case where the PV apparatuses are connected with equal intervals in the movement direction of the cloud will be illustrated. That dispositions of the PV apparatuses of the both power distribution systems are in the same phase indicates that the voltage fluctuation by the variation of the solar radiation becomes in the same timing in the power distribution systems of the both. On the other hand, if the phase of disposition of the both PV apparatuses is shifted, the voltage fluctuations of the both will have different timings. Thus, when concatenating the power distribution systems having the distributed power sources whose phases are different, the voltage fluctuation becomes a smooth inclination. A shift of the phases of the distributed power sources that the concatenated power distribution systems have is used as the evaluation function, and the combination of the switches can be solved as, for example, a combination problem of round robin so that this evaluation function may become minimum (or maximum).

That is, for the combination of open and close of all the switches, in a group formed with the nodes (n11 to n55) in the combination connected, a phase shift of the distributed power sources in that group is designated as the evaluation function. Then, the generation part 11 of the system reconfiguration signal designates one whose evaluation function becomes minimum (or maximum) as a solution, and obtains the open/close signal for the switch 13.

Incidentally, as a solution technique of acquiring a solution, it can be solved using a certain existing optimization technique. The present invention does not limit the kind of optimization technique.

Next, the solution acquired as described above is subjected to recalculation that gives it a restriction. The electric power supply by the distributed power source in a certain area suffers a geographical and temporal fluctuation according to the weather. For example, when a cloud flows in, in the area without the cloud, the solar photovoltaic generation is performed, whilst in an area where the solar radiation is intercepted by the cloud, the solar photovoltaic generation decreases. Although the cloud moves while doing generation, extinction, deformation, etc., only the movement of the cloud is taken assuming that what is considered is a relatively narrow area.

Figure 6:
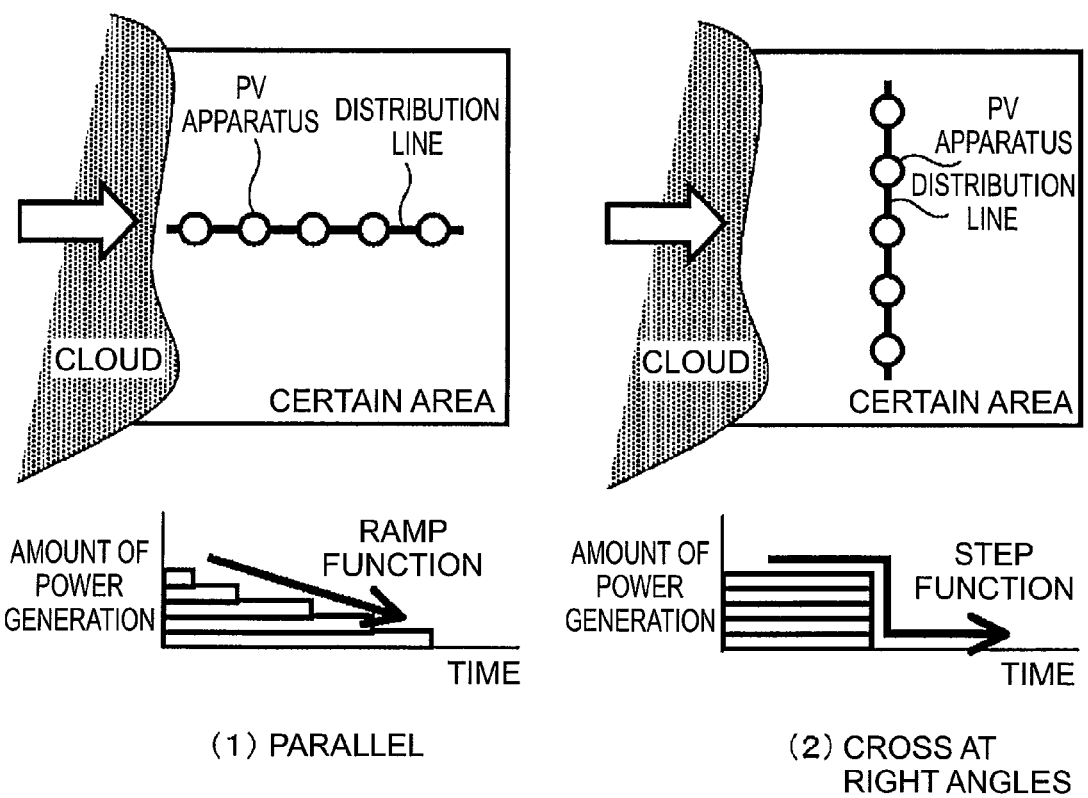
FIG. 6 is a diagram showing a movement direction of a cloud, and a disposition of PV apparatuses.

FIG. 6 shows a variation of the solar photovoltaic generation by a movement (inflow) of the cloud schematically. In the power distribution system in which the PV apparatuses are arranged in parallel to the movement direction of the cloud as shown in FIG. 6(1), the PV apparatuses are shadowed by the cloud gradually and the output of the solar photovoltaic generation decreases gradually (in the form of a ramp function). On the other hand, as shown in FIG. 6(2), in the power distribution system in which the PV apparatuses are arranged crossing the movement direction of the cloud at right angles, all the PV apparatuses are shadowed by the cloud simultaneously, and the output of the solar photovoltaic generation decreases in the form of a step function.

Thus, it is understood that the voltage of the power distribution system that receives supply of a generated electric power differs in characteristic depending on a positional relationship of the cloud and the PV apparatuses. That the system is configured so that the PV apparatuses are arranged in parallel to the movement direction of the cloud as much as possible will bring an effect of the voltage stabilization. The connection points between the power distribution system and the PV apparatuses changes the relationship between the movement direction of the cloud and the arrangement of the PV apparatuses described above by changing electrical and mechanical connections. That is, in the combination of the nodes (n11 to n55) obtained above, it is determined whether the step function occurs in each group. When the step functions occurs, this combination of the nodes (n11 to n55) is excluded and a calculation of a combination of the nodes (n11 to n55) is performed again. According to this result, the open/close control signal is transmitted to the switch 13.

As a result thus obtained, reconfiguration of the switches 13 as shown in FIG. 1(2) or (3) is performed.

Next, an operation of the generation part 12 of the driving signal of the voltage control apparatus will be explained. As mentioned above, the stabilization of the system voltage can be realized by computation of the driving signal of the switch 13 based on the weather forecast information. However, since this is a control based on the forecast information to the end, occurrence of a prediction error cannot be avoided. Moreover, in order to utilize the weather forecast information, such as the short-term variation of the amount of solar radiation, a variation of the wind speed, etc., a high-speed operation of the switch 13 becomes necessary. Then, by combining driving of the voltage control apparatus based on the weather forecast information with reconfiguration of the system using the switches based on the weather forecast information, further stabilization of the voltage can be realized. Below, a method of controlling the voltage control apparatuses, such as the SVR and the SVC, by the forecast weather information will be illustrated.

Figure 8:
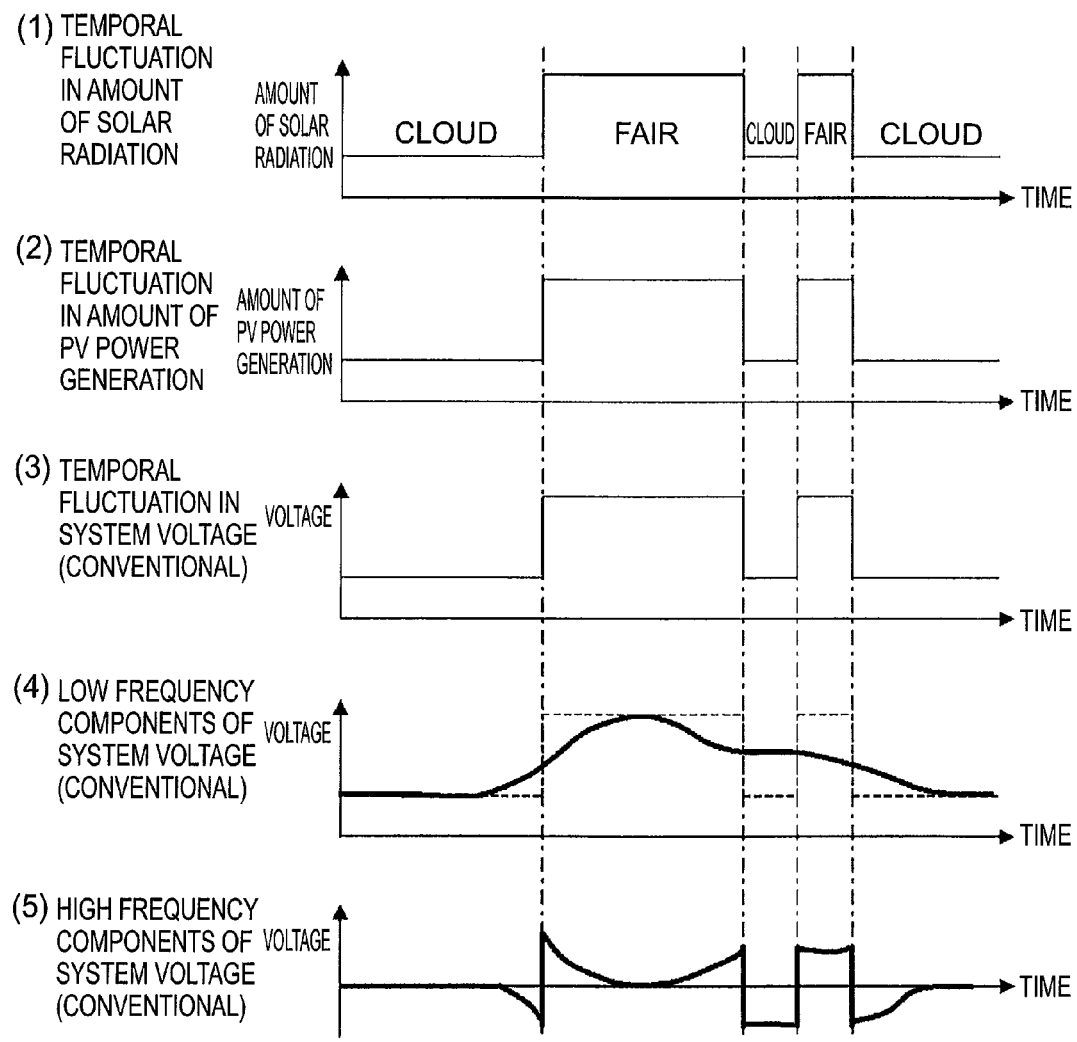
FIG. 8 is a diagram for explaining voltage stabilization based on weather forecast information.

Moreover, a comparative example will be explained. FIG. 8 shows a solar radiation forecast information and the fluctuation of the system voltage. FIG. 8(1) shows the variation of the amount of solar radiation in the prediction period. It is cloudy at the start of the prediction period, then two fair periods elapse after that, and it returns to cloudy at the end of the prediction period. FIG. 8(2) shows an amount of power generation of the solar photovoltaic generation, which synchronizes with the variation of the solar radiation in the prediction period. FIG. 8(3) shows the variation of the system voltage by the solar photovoltaic generation, which synchronizes with the variation of the solar radiation in the prediction period. It is presupposed that a voltage control by the SVR and the SVC is performed in order to stabilize this voltage. FIG. 8(4) shows low frequency components of the system voltage that is predicted.

The generation part 12 of the driving signal of the voltage control apparatus in this embodiment makes the voltage control apparatus perform a step operation so that this low frequency component may be compensated. What should be observed here is that when a voltage waveform in the prediction period is decomposed into frequency components, the low frequency components have changed before the fluctuation of the system voltage takes place. Then, as shown in FIG. 8(5), the SVC is operated so that a residual, i.e., a difference of the response of the SVR and FIG. 8(3) (if putting it in further other words, high frequency components of the system voltage) may be compensated. Thus, the generation part 12 of the driving signal of the voltage control apparatus starts its operation for compensating a fluctuation before an actual voltage fluctuation takes place. Thereby, an error of the compensation when the fluctuation actually takes place can be reduced. The stabilization of the system can be realized by performing such a control repeatedly each time new information is inputted.

Figure 9:
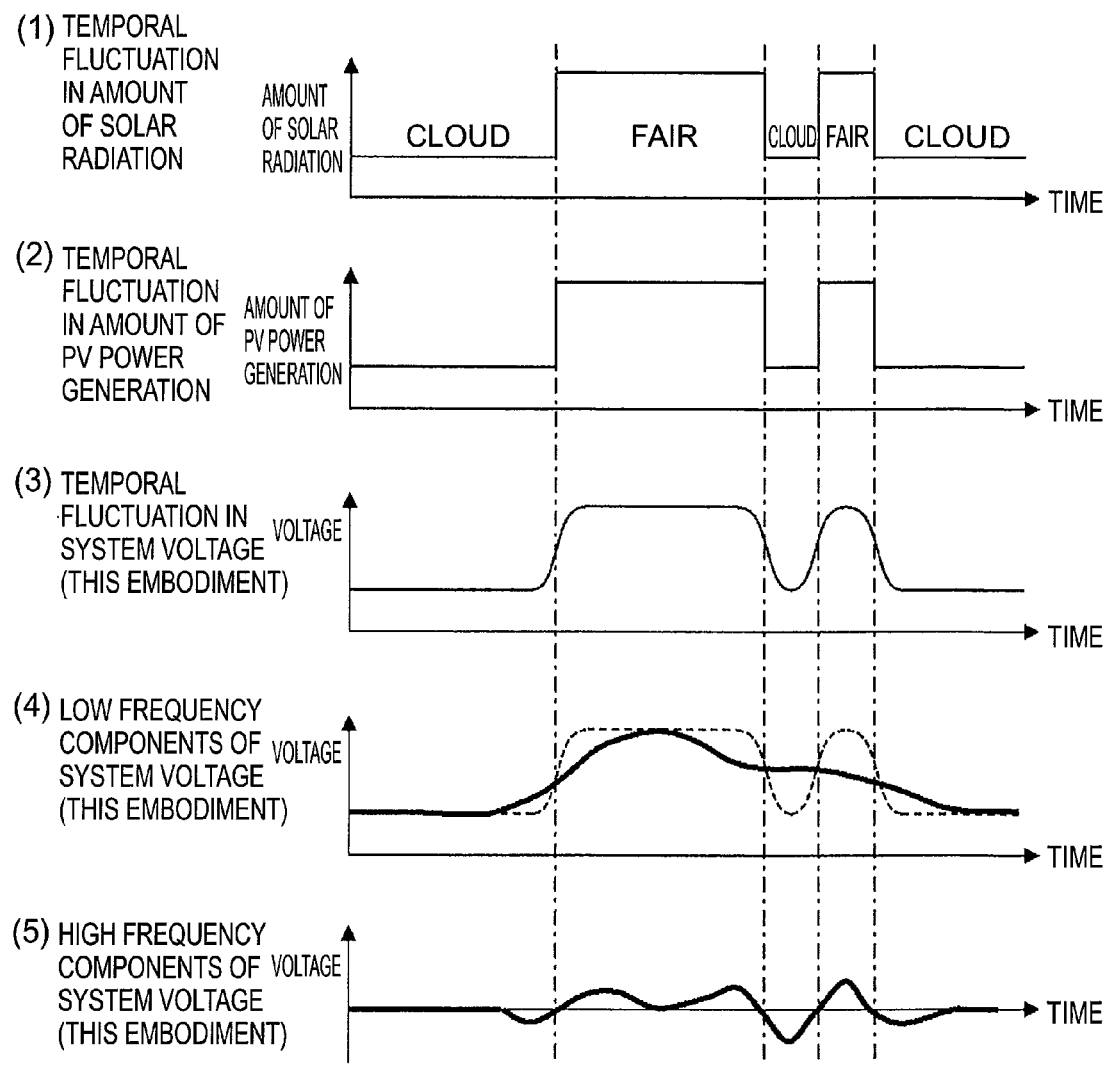
FIG. 9 is a diagram for explaining the voltage stabilization based on the weather forecast information.

FIG. 9 shows the solar radiation forecast information and the variation of the system voltage when the system reconfiguration is performed using the switches. As compared with FIG. 8 mentioned above, in FIGS. 9(1) to (5), the fluctuation of the system voltage becomes gentle by the system reconfiguration using the switches. If the voltage fluctuation is gentle, burdens of the voltage control by the SVR and by the SVC will decrease. This will be a merit of being capable of reducing costs taken by the voltage control apparatuses, such as the SVR and the SVC.

A relation of the distributed power source and the weather information is explained. A relation of the amount of solar radiation and the solar photovoltaic generation will be explained mainly as the distributed power source. Similarly, the voltage control apparatus can be applied to a relationship between wind (the wind direction, the wind speed) and the wind power generation, a relationship between river and a water wheel, etc.

An operation to time elapse of this embodiment will be explained using figures.

Figure 7:
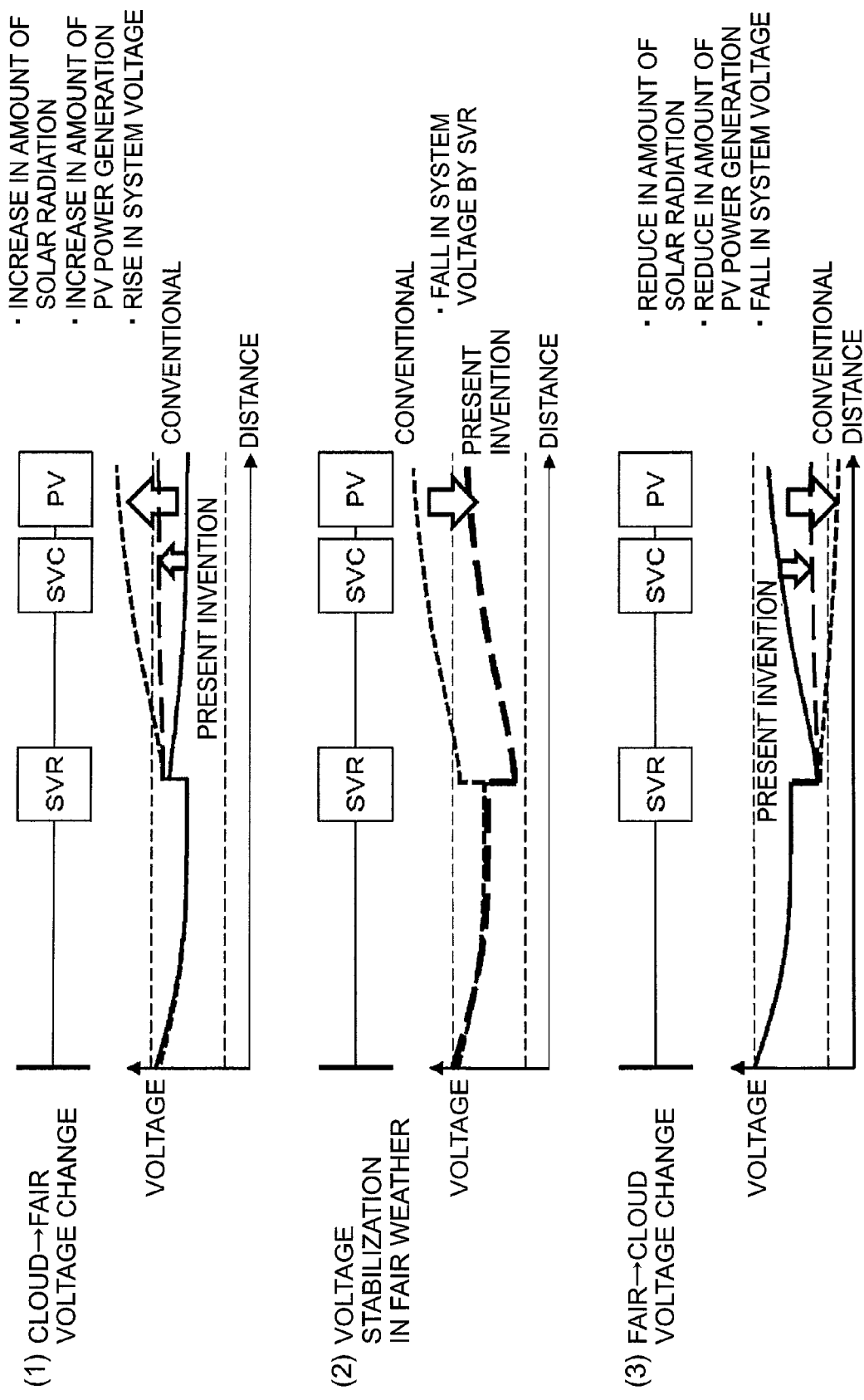
FIG. 7 is a diagram showing a stabilization method of the system voltage.

FIG. 7 schematically shows the power distribution system spanning from a distribution substation to the consumer having the PV apparatus at an end and the voltage distribution thereof. It is presupposed that the voltage control apparatus 1, the voltage control apparatus 2 (14, 15), the SVR, and the SVC are connected to the system for the purpose of suppressing the voltage fluctuation. In the system to which the distributed power source, such as the PV apparatus, is not connected, there is often the case where the voltage tends to lower as approaching the end. In contrast to this, in the system that receives power supply from the distributed power source, since a current becomes a so-called reverse tidal current, the voltage at the end increases. The amount of power generation of the distributed power source suffers a fluctuation by the weather, and the system voltage distribution to which the distributed power source is connected will fluctuate under the influence of the weather. For stable operations of a system facility capacity, a connected load facility, etc., the voltage of the system is required to be fixed within a given permissible range. For example, the domestic low voltage power distribution system is regulated to have 101±6V as its permissible range. In order to observe this, it is commonly practiced to have the voltage control apparatuses 14, 15 and control the voltage. This is also the same in a high voltage power distribution system. FIG. 7(1) shows the system voltage distribution when a state changes from cloudy to fair. Even when the voltage was within the permissible range when it was cloudy and the amount of power generation increases when it becomes fair, the figure shows that the voltage remains at a voltage within the permissible range under an influence of the solar photovoltaic generation in this embodiment. FIG. 7(2) shows an operation of keeping the voltage within the permissible range by voltage lowering by the SVR. FIG. 7(3) shows that the voltage is controlled to be a voltage within the permissible range in this embodiment even when the weather changes from fair to cloudy. As shown in this example, although the system voltage having the distributed power source will largely fluctuate according to the weather, it is possible to maintain it within the permissible range in this embodiment. That is, as shown in FIGS. 1(2) and (3), since the switches are driven so that the PV apparatuses may be arranged in parallel to the movement direction of the cloud before an actual voltage fluctuation takes place based on the weather forecast information, an effect of suppressing the fluctuation of the system voltage that a fluctuation of the amount of solar radiation brings about is acquired. This becomes a merit that can reduce costs taken by the voltage control apparatuses, such as the SVR and the SVC.

Second Embodiment

Next, a second embodiment will be explained. In the second embodiment, since only calculation related to the evaluation function differs from the first embodiment and other configurations are the same as those of it, only different points will be explained. That is, explanations of other different portions are omitted.

With respect to computation of the voltage distribution that is related to ON/OFF of the switch 13 and is by the tidal current computation of the electric power system, an evaluation result is subjected to an arithmetic operation using the evaluation function. For the tidal current computation of the electric power system, what is known as a general technique of system analysis is used. The generation part 12 of a predicted distribution of the predicted voltage of the system voltage in FIG. 9(2) obtains the voltage distribution by carrying out tidal current computation based on information on the system configuration including the switches 13 and the amount of power generation by the distributed power source. The voltage distribution is computed by incorporating the amount of power generation of the distributed power source based on the weather forecast information and a combination of the switches 13 that lessens the voltage fluctuation into this tidal current computation. Then, the evaluation result is calculated using a magnitude of the voltage fluctuation as the evaluation function.

For one power distribution system having the PV apparatuses, a response characteristic corresponding to the variation of the amount of solar radiation by the movement of the cloud can be modeled. The response characteristic is governed by the positional relationship of the movement direction of the cloud and the PV apparatuses; if they intersect at right angles, it will be a response of the step function, whilst if being in parallel, it is expressed by a response of the ramp function. An amplitude of each response is determined by the amount of power generation of the PV apparatus to be connected with. The response being the step function is that it includes high frequency components, which is not suitable for the stabilization of the system. An effect of concatenation by the switches is to mitigate an inclination of the voltage fluctuation by combining the power distribution systems having these response characteristics. Although the effect of combination varies depending on a position of the concatenating point, a rough tendency becomes as follows. When concatenating systems with two step functions on the same line, it gives a response of the same step function in which amplitudes are added. Concatenation of systems with the step function and with the ramp function gives a response of an intermediate ramp function. Regarding the combination of ON/OFF of the switches 13, one such that, designating an inclination of the response signal in the group where the nodes (n11 to n55) are combined as an index, taking a total sum of the indices according to an order of the response signals, and designating it as an evaluation function, its response signal becomes gentle and the evaluation function becomes minimum (or maximum) will be selected. Like the above-mentioned method, a problem of such a combination can be solved, for example, as the combination problem of round robin. Alternatively, it can be solved as a certain optimization problem using an existing optimization technique.

Thus, a combination of ON/OFF of the switches that minimizes (or maximizes) this evaluation function is set as a combination problem similarly with the embodiment method, and it can be solved, for example, as the combination problem of round robin. Alternatively, it can be solved as a certain optimization problem using an existing optimization technique.

Incidentally, it is all right that the evaluation function of the first embodiment and the evaluation function of the second embodiment are combined as an evaluation function, for example, these are added with weights to obtain a sum, which is used as a new evaluation function, and thereby a combination of the switches 13 is obtained.

Third Embodiment

Next, a third embodiment will be explained. In the third embodiment, only different points thereof from the first and second embodiments will be explained. That is, since other configurations are the same as those of the first and second embodiments, their explanations are omitted.

For a computation of ON/OFF driving signals of the switches 13, results calculated in advance can be summarized in a form of table. Alternatively, as long as computing capability is high, they may be computed in real time. In the case of prior computation that is the former, a variation of the amount of solar radiation on the ground will be predicted based on the weather forecast information about the movement direction of the cloud, the size and shape of the cloud, the azimuth and altitude of the sun, etc.

Although the explanations heretofore given were explained without distinguishing single phase and three phase of the electric power system, it goes without saying that the present invention is applicable to the both. Moreover, in the case of a three-phase electric power system (UVW), the driving signal of the switch 13 can be generated so that an interphase voltage may be balanced.

There is a case where in an intermediate stage when the system is reconfigured by driving the switches 13, the voltage fluctuation by the reconfiguration may take place. It is desirable that the voltage fluctuation in this intermediate stage of the reconfiguration is small. The switches are driven so that the system may pass through multiple system configurations in the intermediate stages until it reaches a target system configuration from the system configuration at the present moment. In this intermediate stage, an effect of fluctuation suppression (the so-called leveling effect) obtained by increasing the number of the concatenation points between the systems more than that of the steady state is realized. Taking the mesh type system mentioned above as an example, by making the system configuration at the present moment pass though a configuration of the complete mesh type where all the switches are turned ON before the target system configuration is reached, it is possible to suppress the voltage fluctuation in the intermediate stage of the reconfiguration. However, it is as described above that configuring a complete mesh type regularly comes with a problem of fault occurrence as described above, which is not desirable. In an actual electric power system, the switches are driven so that the concatenation points may increase in the intermediate stage of the reconfiguration of the system, and after that, the switches are driven so that the target system configuration may be realized. Thus, in the intermediate stage, the voltage fluctuation can be suppressed by making the concatenation points by the switches increase. Although the time that is needed in this intermediate stage is not restricted particularly, it is desirable to set it to a short time. Moreover, the system reconfiguration is performed in a time zone when an influence of the voltage fluctuation by a weather fluctuation is small and the weather is stable, Regarding the solar photovoltaic generation, the time zone is night, whilst regarding the wind power generation, it can be set to a time zone of a calm when the wind speed is small. Moreover, similarly, a time zone when a fluctuation of the load connected to the system is small may be selected.

The present invention does not limit means for configuring the switch. It may be a mechanical switching means or a switching means using a semiconductor device. Conventionally, whereas the switch is often used to disconnect a fault spot, a new switch whose object is reconfiguration of the system may be configured. Specifically, such a switch as follows is desirable: a switching action is performed in a short time; a durable frequency of repeated open/close is large; a remote control is easy; maintenance of a switching element etc. is unnecessary; and it is lightweight and cheap. Moreover, in the explanation heretofore given, the configuration of generating the driving signal for turning ON/OFF the switch electrically or electronically is explained. Alternatively, the switch may be configured to have means for displaying ON/OFF visually in order to allow this ON/OFF to be performed by a human manual operation and to guide a human to perform the manual operation of the switch based on this. When driving multiple switches to turn ON/OFF according to a temporal order, reconfiguration of a target system can be realized by performing operations as directed by the guidance display that is set in order so that misunderstanding may not occur. If the switch using a semiconductor device is used, since a required time for the system reconfiguration can be shortened and there is durability in the number of open/close, it becomes possible to perform further frequent switching. Since this also reduces restrictions of the time zone in which the reconfiguration is performed and also shortens a required time in the intermediate stage of the reconfiguration mentioned above, it is possible to reconfigure a regularly dynamic system and to realize the stabilization of the system voltage. The present invention does not limit a unit of time that this dynamic reconfiguration of the system means. The driving signal of the switch is generated by setting one day to the unit when it is long or setting a millisecond to the unit when it is short. The present invention does not limit the kind of the weather forecast information used at this time. Pieces of the weather forecast information that were obtained from multiple information sources may be used after being combined. For example, when there is forecast information that the amount of solar radiation changes largely in several seconds, the fluctuation of the system voltage is suppressed by increasing the concatenation points of the system prior to an actual variation of the amount of solar radiation. The system configuration is returned to the system configuration that prepares for a fault by reducing the concatenation points of the system at a time when the variation of the amount of solar radiation ends. In this way, the function of the voltage stabilization that is realized with the voltage control apparatus conventionally will be able to be realized by the system reconfiguration with the switches.

Although, the explanation is given supposing that the switch is a switching means of ON/OFF, the switch may be provided with a function of a reactance or capacitance. For example, an ON function may be realized by electromagnetic induction connection of a transformer, or electrostatic coupling of a capacitor. Further, a switching function by the semiconductor device may be combined with these reactance or capacitance. In either case, the present invention is characterized by generating the driving signal for the voltage stabilization based on the weather forecast information.

The evaluation function for generating the driving signal of the switch may have many variations except for what is described in the above-mentioned embodiments. For example, reducing the number of switchings of the switch, making small the voltage variation at the time of switching of the switch, a spread range of a fault at the time of fault occurrence, etc. can be taken into the evaluation function. Moreover, the fluctuation of a load on the consumer side can be combined.

There are few cases where the actual electric power system has an ideal mesh-type configuration. Moreover, there is a case where limitations exist in the installation spot of the switches, the number of the switches being installed, a system to be concatenated, a propriety of a remote control, etc. However, it is well known that the distributed power source will diffuse from now on as a demand of society toward a low carbon society. At that time, it is also a common knowledge as a technological problem that the distributed power source affects the system voltage. The present invention presents a new concept that the voltage fluctuation is mitigated by reconfiguring the system using the switches. If this concept is incorporated as a feature facility plan, the above-mentioned problem in the present situation will be resolved. For example, by introducing a facility apparatus for making the system reconfiguration easy aiming at the electric power system in consideration of effective use and stabilization of a large number of distributed power sources from a stage of constructing new rows of houses, the feature of the present invention can be put to full use.

Thus, the present invention presents a sufficiently practical solution measure and a prospective plan, and its utilization effect is large.

In carrying out the present invention, the weather forecast information can utilize an arbitrary signal related to the weather although it is not a signal directly related to the weather. Since the weather conditions and the system voltage are linked by many factors, for example, the amount of solar radiation, daylight hours, the amount of PV power generation, PCS (power conditioner), AMI measurement data (selling electric power and buying electric power), etc. perform related operations, any of these factors can be used as information related to the weather. Moreover, the weather conditions may be collected as information of a certain sensor not related to electric power, and hence information relevant to the weather collected by, for example, a surveillance camera, an automatic on/off device of a streetlight, a sensor loaded on a personal digital assistant, etc. may be used. Moreover, information from, for example, the Meteorological Agency, a weather service company, or the like that distributes weather information may be used without doing anything related to means and method for collecting the weather conditions. Thus, the weather forecast information may be not related to weather explicitly.

Moreover, a system state of an area where the fluctuation has already taken place by being affected by the fluctuation of the amount of solar radiation may be collected and may be used for the system stabilization of an area that has not been affected by the fluctuation of the amount of solar radiation yet. This utilizes a fact that since the weather conditions, such as the amount of solar radiation, often continues in terms of an area and a time, result information of an adjacent area can be used as forecast information of the area.

Thus, an effect of suppressing the voltage fluctuation together with the reconfiguration of the system can be obtained by controlling the voltage control apparatus in advance so that a voltage margin may increase based on the weather forecast information.

Moreover, the consumer having the distributed power source, such as the solar photovoltaic generation, can obtain an effect of increasing an opportunity of selling surplus power by controlling so that the stabilization of the system may be improved.

The above embodiments show concrete examples of the content of the invention of the application, the invention of the application is not limited to these embodiments, and various alterations and modifications are possible by a person skilled in the art within a range of technological thought disclosed in this description.

LIST OF REFERENCE SIGNS

10 Generation part of predicted amount of PV power generation
11 Generation part of system reconfiguration signal
12 Generation part of driving signal of voltage control apparatus
13 Switch
101 Stabilizer of system voltage of the present invention
201 Stabilization method of system voltage of the present invention

The invention claimed is:
1. A power system comprising:
a plurality of nodes;
a plurality of natural energy power generation apparatuses;
a plurality of switches disposed at respective nodes connecting respective natural energy power generation apparatuses to the power system;
a plurality of voltage control apparatuses respectively disposed at one or more of the plurality of nodes, wherein each voltage control apparatus is one of a step voltage control apparatus and a static var compensator,
a voltage stabilizer for stabilizing a voltage of the power system, wherein the voltage stabilizer comprises:
a power generation quantity predilection part configured to receive weather forecast information;
a voltage apparatus signal generation part connected to the power generation quantity part and connected to the plurality of voltage control apparatuses; and
a system reconfiguration signal generation part connected to the voltage apparatus signal generation part and each of the plurality of switches, the system reconfiguration signal generation part configured to receive system configuration information,
wherein the power generation quantity prediction part is configured to predict an amount of power generation of the respective natural energy power generation apparatuses based on the received weather forecast information,
wherein the voltage control apparatus signal generation part is configured to generate control signals for controlling the plurality of voltage control apparatuses based on the predicted amount of power generation of the natural energy power generation apparatuses,
wherein the system reconfiguration signal generation part is configured to calculate an open/close instruction for connecting/disconnecting each of the switches of the power system based on the predicted amount of power generation of the plurality the respective natural energy power generation apparatuses and the system configuration information, and generate a driving signal for each of the plurality of switches based on the open/close instruction for the switches, and wherein the system configuration information includes node location information of each of the voltage control apparatuses, location information of each of the switches, and location information of each of the natural energy power generation apparatuses.

2. The power system according to claim 1, wherein the natural energy power generation apparatus is one of solar photovoltaic generation and wind power generation.

3. The power system according to claim 1, wherein the weather forecast information includes an amount of solar radiation in an electric power system having solar photovoltaic generation, and a wind speed in an electric power system having wind power generation.

4. The power system according to claim 1, wherein the system configuration information includes a connection point of a distributed power source, a line of the system, and a kind of a voltage control apparatus.

5. The power system according to claim 1, wherein the driving signal of the switch is generated so that the system may go through a plurality of stages of system configurations that span from a system configuration at the present moment to a system configuration that is reconfigured.

6. A system voltage stabilization method for stabilizing a voltage of a power system, the power system comprising:
a plurality of nodes;
a plurality of natural energy power generation apparatuses;
a plurality of switches disposed at respective nodes connecting respective natural energy power generation apparatuses to the power system;
a plurality of voltage control apparatuses respectively disposed at one or more of the plurality of nodes, wherein each voltage control apparatus is one of a step voltage control apparatus and a static var compensator,
a voltage stabilizer for stabilizing a voltage of the power system, wherein the voltage stabilizer comprises:
a power generation quantity predilection part;
a voltage apparatus signal generation part connected to the power generation quantity part and connected to the plurality of voltage control apparatuses; and
a system reconfiguration signal generation part connected to the voltage apparatus signal generation part and each of the plurality of switches,
the method comprising the steps of:
receiving weather forecast information, by the power generation quantity prediction part;
receiving system configuration information of the power system, by the system reconfiguration signal generation part;
predicting an amount of power generation of the natural energy power generation apparatuses based on the weather forecast information, by the power generation quantity part;
generating control signals for controlling the voltage control apparatuses based on the predicted amount of power generation of the natural energy power generation apparatuses, by the voltage control apparatus signal generation part; and
calculating an open/close instruction for connecting/disconnecting each switch of the power system based on the predicted amount of power generation of the natural energy power generation apparatuses and the system configuration, and generating a driving signal for each of the switches based on the open/close instruction for the switches, by the system reconfiguration signal generation part,
wherein the system configuration information includes node location information of each of the voltage control apparatuses, location information of each of the switches, and location information of each of the natural energy power generation apparatuses.

7. The power system electric power stabilizer according to claim 1, wherein the open/close instruction is calculated so that a system voltage of the power system is maintained within a predetermined range.

8. The power system electric power stabilizer according to claim 1, wherein the open/close instruction is calculated so that a deviation of a system voltage of the power system is minimized.

9. The power system voltage stabilization method according to claim 6, wherein the open/close instruction is calculated so that a system voltage of the power system is maintained within a predetermined range.

10. The power system voltage stabilization method according to claim 6, wherein the open/close instruction is calculated so that a deviation of a system voltage of the power system is minimized.

* * * * *